(12) United States Patent
Shanbhogue et al.

(10) Patent No.: US 10,402,218 B2
(45) Date of Patent: Sep. 3, 2019

(54) DETECTING BUS LOCKING CONDITIONS AND AVOIDING BUS LOCKS

(71) Applicant: INTEL CORPORATION, Santa Clara, CA (US)

(72) Inventors: Vedvyas Shanbhogue, Austin, TX (US); Gilbert Neiger, Portland, OR (US); Arumugam Thiyagarajah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 15/251,425

(22) Filed: Aug. 30, 2016

(65) Prior Publication Data

US 2018/0060099 A1   Mar. 1, 2018

(51) Int. Cl.
| | | |
|---|---|---|
| *G06F 11/30* | (2006.01) | |
| *G06F 9/455* | (2018.01) | |
| *G06F 11/22* | (2006.01) | |
| *G06F 12/14* | (2006.01) | |
| *G06F 12/1045* | (2016.01) | |

(52) U.S. Cl.
CPC ........ *G06F 9/45558* (2013.01); *G06F 11/221* (2013.01); *G06F 11/3027* (2013.01); *G06F 11/3055* (2013.01); *G06F 12/1475* (2013.01); *G06F 12/1045* (2013.01); *G06F 2009/45579* (2013.01); *G06F 2009/45583* (2013.01); *G06F 2009/45591* (2013.01); *G06F 2212/1008* (2013.01); *G06F 2212/151* (2013.01); *G06F 2212/152* (2013.01); *G06F 2212/68* (2013.01)

(58) Field of Classification Search
CPC ...... G06F 13/40; G06F 13/4022; G06F 13/00; G06F 13/20; G06F 13/28; G06F 12/14; G06F 12/466; G06F 12/1475; G06F 2009/45591; G06F 11/3055; G06F 2212/151; H04L 67/125

See application file for complete search history.

(56) References Cited

U.S. PATENT DOCUMENTS 5,761,719 A * 6/1998 Mahin ................. G06F 12/0888
711/138
6,587,964 B1 * 7/2003 Brooks ..................... G06F 9/52
710/108

(Continued)

FOREIGN PATENT DOCUMENTS

WO   2006/077261 A2   7/2006

OTHER PUBLICATIONS

Wikipedia's General Protection Fault historical version published Jul. 7, 2016 https://en.wikipedia.org/w/index.php?title=General_protection_fault&oldid=728810630 (Year: 2016).*

(Continued)

*Primary Examiner* — Joseph O Schell
(74) *Attorney, Agent, or Firm* — Lowenstein Sandler LLP

(57) ABSTRACT

A processor may include a register to store a bus-lock-disable bit and an execution unit to execute instructions. The execution unit may receive an instruction that includes a memory access request. The execution may further determine that the memory access request requires acquiring a bus lock, and, responsive to detecting that the bus-lock-disable bit indicates that bus locks are disabled, signal a fault to an operating system.

24 Claims, 11 Drawing Sheets

(56) References Cited

U.S. PATENT DOCUMENTS

| | | | |
|---|---|---|---|
| 7,356,735 B2* | 4/2008 | Bennett | G06F 11/3664 |
| | | | 714/34 |
| 2004/0093469 A1* | 5/2004 | Glasco | G06F 12/0815 |
| | | | 711/145 |
| 2005/0172169 A1 | 8/2005 | Sekiguchi et al. | |
| 2008/0163205 A1* | 7/2008 | Bennett | G06F 9/45558 |
| | | | 718/1 |
| 2008/0288941 A1* | 11/2008 | Adams | G06F 9/45558 |
| | | | 718/1 |
| 2012/0331265 A1* | 12/2012 | Rozario | G06F 12/1009 |
| | | | 711/207 |
| 2014/0006661 A1* | 1/2014 | Chappell | G06F 13/42 |
| | | | 710/105 |
| 2016/0203027 A1 | 7/2016 | Challa et al. | |

OTHER PUBLICATIONS

Wikipedia's Processor Register historical version published Aug. 14, 2016 https://en.wikipedia.org/w/index.php?title=Processor_register&oldid=734482294 (Year: 2016).*

International Search Report and Written Opinion for PCT/US2017/042256, 9 pages, dated Oct. 23, 2017.

* cited by examiner

DETECTING BUS LOCKING CONDITIONS AND AVOIDING BUS LOCKS

The present disclosure relates to the field of memory management and, in particular, to the use the detection and avoidance of bus locking conditions.

BACKGROUND

A processor may lock a system bus or equivalent link during certain memory operations. When a bus lock is asserted, memory access requests from other agents are blocked.

DESCRIPTION OF EMBODIMENTS

Figure 1:
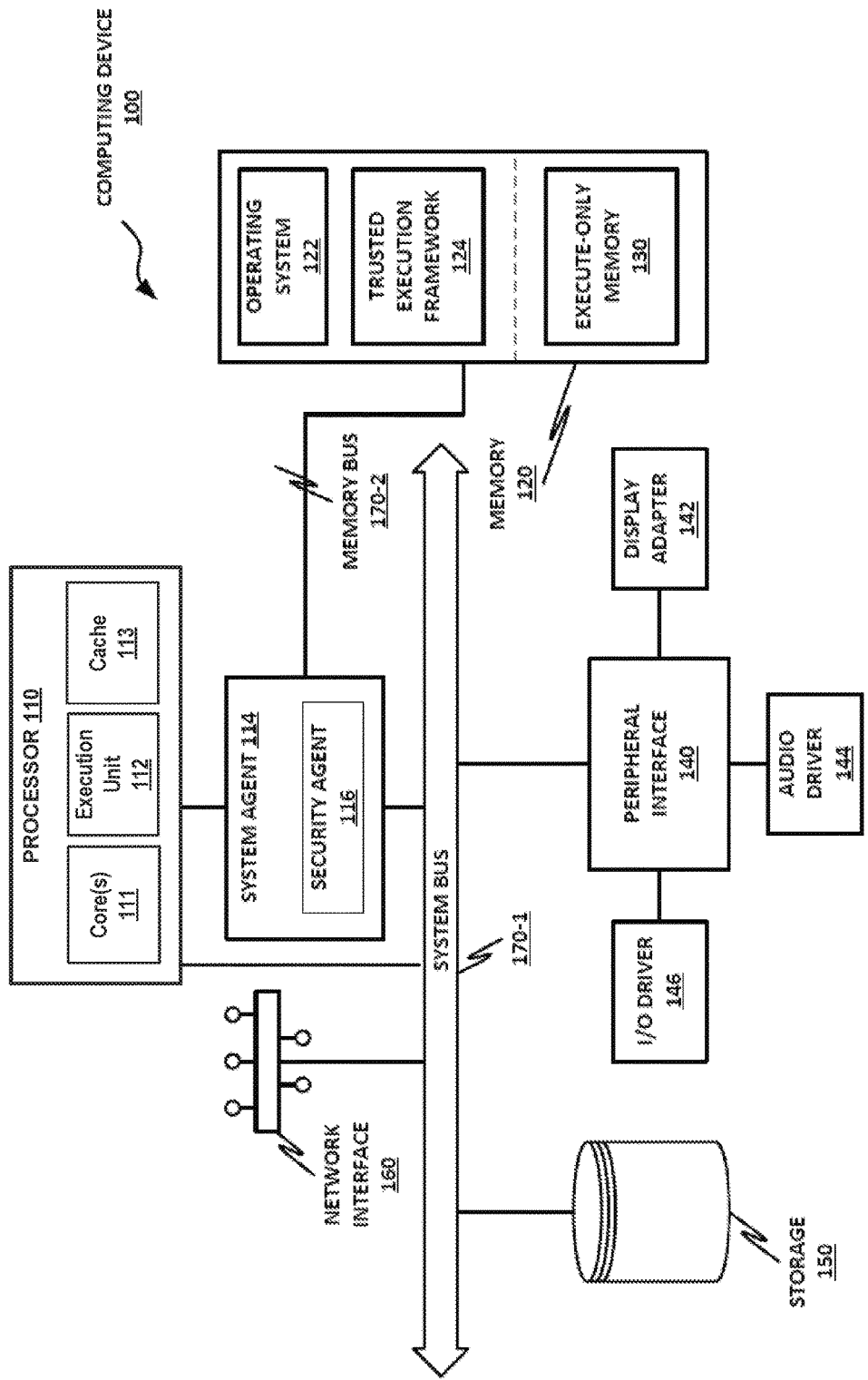
FIG. 1 is a block diagram of a computing device illustrating an environment in which bus locking occurs, according to an embodiment of the present disclosure.

A processor may lock a system bus or an equivalent interconnect during certain memory operations such as a locked operation to uncacheable memory, locked operations that span multiple cache lines, and page-walks from page tables in uncacheable memory when translating a logical address of a virtual machine. When such a bus lock is asserted, memory access requests from other agents are blocked. Bus locks, however, have a high performance penalty and excessive use of bus locks can significantly degrade system performance.

In an illustrative example, a bus lock may be needed with uncacheable memory because updates to addresses of the uncacheable memory are made in the main memory, and hence the bus lock is needed to ensure coherency of the data being written back to the main memory. This scenario may be relevant for some devices (such as legacy devices or other agents communicating with the bus) that do not allow caching of data or are unable to snoop processor caches, and so there may be an older copy of data on the processor for the device.

In another illustrative example, when accessing two cache lines in a cache in response to a memory request, a processor may need to lock the system bus in order to ensure memory coherency because another agent could change one of the two cache lines while the processor is accessing or updating the other of the two cache lines.

In another illustrative example, in performing virtual-to-physical address translations for a virtual machine (VM), a memory management unit (MMU) of the VM may, in response to a translation lookaside buffer (TLB) miss for the address being translated, request a hardware page table walker to search (e.g., "walk") a page table stored in the memory to determine the physical address and automatically load the physical address into the TLB. Use of the hardware page table walker may reduce overhead and speed up TLB miss handling and fault processing. At times, the processor may also update the page tables upon the MMU request. To do so, the processor may need to assert a bus lock to perform the page table update, to ensure that no other agent is updating the page table at the same time.

The present disclosure provides systems and method for detection of these types of memory operations (among others), and performing steps to avoid a bus lock being acquired, thus increasing system performance. Avoidance of bus locking may be especially useful in computing centers operating in the cloud that need to run untrusted workloads on cloud platforms. In a multi-tenanted environment, such untrusted workloads may cause significant degradation to the other workloads on the platform if the untrusted workloads cause bus locking conditions, thus harming the cloud infrastructure as a whole.

Without the disclosed detection of bus locking conditions and avoidance of bus locks, platforms that need to run real-time workloads may face significant issues like missing deadlines and thus causing failure due to misbehaving applications asserting bus locks. Certifications of such platforms for mission critical usage require guarantees that such conditions cannot be created or can be detected and mitigated.

According to one embodiment, to detect and avoid conditions such as these that cause bus locking, the present disclosure proposes to use a bit flag (referred herein to as bus-lock-disable bit) that may be stored in a processor register (e.g., a model-specific register (MSR)) to indicate that acquisition of bus locks is disabled. An execution unit of the processor may receive a memory access request to execute an instruction. The execution unit may further determine that the memory access request requires acquiring a bus lock by detecting a memory access request or other memory operation discussed above. Responsive to detecting that the bus-lock-disable bit indicates that bus locks are disabled, the execution unit may signal a fault to an operating system. The fault may be, for example, a general protection fault, a system fault, or a VM-related fault, a new fault type to signal disabling of bus locks, among other faults.

A fault handler of the operating system (or of a virtual machine manager (VMM) in the case of an instruction being executed by a virtual machine) may then handle the fault according to the type of fault generated, including termination of the task that has issued the instruction. As a further embodiment, the fault handler may, in response to the fault, emulate the instruction without performing a bus lock. A fault handler handling the fault may need to disable memory accesses from other agents on the bus during the instruction emulation. This detection of a bus lock condition and avoiding acquiring a bus lock in response to the detection may allow platforms that need guarantees on latency like those running real-time operating systems to disallow bus locks being used by software and enforce the disallowance of bus locks with register-based control.

As a further embodiment, a virtual machine monitor (VMM) (e.g., of a cloud services server) may rely upon hardware-enabled virtualization (such as virtual machine extensions (VMX) execution controls) to be notified of requests to acquire bus locks and emulate the request without using bus locks, and thus avoid interference to other workloads. Additionally, or alternatively, a processor core may execute VMX execution control instructions to detect a condition with reference to execution of the virtual machine (VM) that requires acquiring a bus lock. The VMM may enable a bus-lock-exiting bit stored in a virtual machine structure (VMCS) associated with the VM. Furthermore, responsive to detecting that the bus-lock-exiting bit is enabled within the VMCS of the virtual machine, the core may perform a VM exit of the virtual machine to the VMM in lieu of acquiring the bus lock. This may allow the virtual machine to avoid continuing to lock a bus shared with other virtual machines. Alternatively, the core may transmit a fault to an operating system fault handler of the virtual machine, to cause the operating system of VM to deal with the fault to avoid the acquiring a bus lock.

FIG. 1 is a block diagram of a computing device 100 illustrating an environment in which bus locking occurs, according to an embodiment of the present disclosure. In various embodiments, a "computing device" may be or include, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

The computing device 100 includes a processor 110 that includes one or more cores 111, an execution unit 112, and a cache 113. The processor 100 is connected to a system agent 114 for accessing memory 120 and to other components of computing device 100. The processor 110 may also be coupled to a system bus 170-1, which may in turn also include a memory bus 170-2. The computing device 100 may be managed by system software such as operating system 122. The operating system 122 may be any suitable operating system.

The memory 120 may include system software such as the operating system 122, at least software portions of a trusted execution framework (TEF) 124, and one or more regions of execute-only memory 130. The system agent 114, which manages communications between processor 110 and other components of computing device 100, may include a security agent 116 to securely configure and manage the execute-only memory 130.

Other components of the computing device 100 may include a storage 150, a network interface 160, and a peripheral interface 140. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide the memory 120 and the storage 150, for example, in a single physical memory device, and in other cases, the memory 120 and/or the storage 150 are functionally distributed across many physical devices. In the case of virtual machines or hypervisors, all or part of a logical function may be provided in the form of software or firmware running over a virtualization layer to provide the disclosed logical function. In other examples, a device such as a network interface 160 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, executed algorithms, sensors, components, firmware, microcode, programmable logic, or objects that can coordinate to achieve a logical operation.

In one embodiment, the processor 110 may be communicatively coupled to memory 120 via the system agent 114 and/or the memory bus 170-2, which may be, for example, a direct memory access (DMA) bus, though other memory architectures are envisioned, including ones in which the memory 120 communicates with the processor 110 via the system bus 170-1 or some other bus. The processor 110 may be communicatively coupled to other devices via the system agent 114 and/or the system bus 170-1, such as the storage 150, the peripheral interface 140, and the network interface 160.

In various embodiments, the one or more core(s) 111 may execute instructions in order to execute the operating system 122, a VMM, one or more virtual machines, and to perform memory management on behalf of the network interface 160, the peripheral interface 140, or an I/O device or device driver of the computing system 100. In executing such instructions, the core(s) 111 may generate memory requests that are sent to the memory 120 and/or the storage 150. In one embodiment, some of the memory requests may require the processor 110, the system agent 114, or some other system agent or device driver to lock the system 170-1 bus and/or the memory bus 170-2 in response to decoding the instruction or where conditions (such as those previously discussed) are detected that require acquiring bus locks before the execution unit 112 executes the instruction.

As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case the processor 110 may be treated as only one core of a multi-core processor, or may be treated as the entire multi-core processor, as appropriate. In some embodiments, one or more co-processor may also be provided for specialized or support functions.

For simplicity, the memory 120 is illustrated as a single logical block, but a physical embodiment may include one or more blocks of any suitable volatile or non-volatile memory technology or technologies, including for example DDR RAM, SRAM, DRAM, cache, L1 or L2 memory, on-chip memory, registers, flash, ROM, one-time programmable (OTP) memory, optical media, virtual memory regions, magnetic or tape memory, or similar. In certain embodiments, the memory 120 may comprise a relatively low-latency volatile or non-volatile main memory, while the storage 150 may comprise a relatively higher-latency non-volatile memory. However, the memory 120 and the storage 150 need not be physically separate devices, and in some examples may represent simply a logical separation of function. It should also be noted that although DMA is disclosed by way of non-limiting example, DMA is not the only protocol consistent with this specification, and that other memory architectures are available.

The processor 110 may also include, or may be coupled to, the cache 113. The processor 110 may use the cache 113 to provide low-latency access to information retrieved from memory 120. For example, the cache 113 may provide faster memory access than provided by the memory 120. Accordingly, the processor 110 may use the cache 113 to store information retrieved from memory 120 to allow faster access to that information. In some embodiments, the cache 113 may be implemented as a hierarchy of caches, such as a level 1 cache (L1), level 2 cache (L2), level 3 cache (L3), mid-level cache (MLC), last level cache (LLC), and/or combinations thereof.

The storage 150 may be any species of the memory 120, or may be a separate device. The storage 150 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. The storage 150 may be, or may include therein, a database or databases or data stored in other configurations, and may include a stored copy of system software such as the operating system 122 and software portions of the trusted execution framework (TEF) 124. Many other configurations are also possible, and are intended to be encompassed within the broad scope of this specification.

The network interface 160 may be provided to communicatively couple computing device 100 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

The peripheral interface 140 may be configured to interface with any auxiliary device that connects to the computing device 100 but that is not necessarily a part of the core architecture of the computing device 100. A peripheral may be operable to provide extended functionality to the computing device 100, and may or may not be wholly dependent on the computing device 100. In some cases, a peripheral may be a computing device in its own right. Peripherals may include input and output devices such as displays, terminals, printers, keyboards, mice, modems, data ports (e.g., serial, parallel, USB®, Firewire®, or similar), network controllers, optical media, external storage, sensors, transducers, actuators, controllers, data acquisition buses, cameras, microphones, speakers, or external storage by way of non-limiting example.

In one example, peripherals include a display adapter 142, an audio driver 144, and an input/output (I/O) driver 146. The display adapter 142 may be configured to provide a human-readable visual output, such as a command-line interface (CLI) or graphical desktop such as Microsoft Windows®, Apple® OSX desktop, or a Unix™/Linux™ X Window System-based desktop. The display adapter 142 may provide output in any suitable format, such as a coaxial output, composite video, component video, video graphic array (VGA), or digital outputs such as digital visual interface (DVI) or high-definition multimedia interface (HDMI), by way of non-limiting examples. In some examples, the display adapter 142 may include a hardware graphics card, which may have its own memory and its own graphics processing unit (GPU). The audio driver 144 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB®, Bluetooth® or Wi-Fi® audio, by way of non-limiting examples.

The trusted execution framework (TEF) 124, in one example, is operable to provide a trusted environment to securely load and/or execute code and associated data. The TEF 124 may include any suitable combination of hardware, software, and/or encoded logic for performing the functionality described herein for the TEF 124. In one example, the TEF 124 may include executable instructions and/or logic stored on a non-transitory computer-readable medium operable to instruct a processor or other electronic device to provide a trusted execution environment. In some cases, the TEF 124 may additionally or alternatively include a special integrated circuit designed to fully or partially implement functionality of the TEF 124.

The TEF 124 may be used, for example, to attest to the authenticity of a platform or module, such as firmware, BIOS, and/or the operating system 122. Attestation functionality of the TEF 124 may be performed at any appropriate time, such as upon booting the computing device 100 or upon a command from the operating system 122. In some embodiments, TEF 124 may use microcode or an authenticated code module (ACM) to perform secure loading and attestation functionality.

In some cases, TEF 124 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that the TEF 124 may also include other hardware and software, including configuration files, registry entries, and interactive or user-mode software by way of non-limiting example.

The system agent 114 may manage communication between the processor 110 and other components of the computing device 100. In various examples, the system agent 114 may include any combination of logic elements configured to perform functionality of the system agent 114 described herein, whether loaded from memory or other non-transitory computer readable medium, or implemented directly in hardware, including by way of non-limiting examples a microprocessor, digital signal processor, field-programmable gate array, graphics processing unit, programmable logic array, application-specific integrated circuit, or virtual machine processor. The system agent 114 may be integrated with processor 110, or alternatively, the system agent 114 may be implemented on a separate chip connected to the processor 110. In some embodiments, the system agent 114 may facilitate high-performance computing tasks. For example, the system agent 114 may include a memory controller to provide an interface between the processor 110 and the memory 120. The system agent 114 may also provide a bridge between the processor 110 and other components of the computing device 100, for example, using a direct media interface (DMI) and/or PCI-Express® bridge. The system agent 114 may also include the security agent 116 to provide security functionality, including management of execute-only memory 130.

In some embodiments, the security agent 116 may securely configure and manage the execute-only memory 130, for example, to avoid code and embedded confidential information from being read from the execute-only memory 130 for any purpose other than code execution. The security agent 116 may be any suitable combination of hardware, software, and/or encoded logic capable of performing the functionality described herein for the security agent 116. In some embodiments, functionality of the security agent 116 may be implemented by the system agent 114, the processor 110, a separate component connected to the system agent 114 and/or the processor 110, and/or a combination thereof.

In some embodiments, the security agent 116 may designate one or more regions of the memory 120 as execute-only memory 130. The execute-only memory 130 can only be accessed to retrieve code for execution. The execute-only memory 130 may be used, for example, to store protected information, such as firmware, any secrets or keys embedded in the firmware, and/or any other confidential code, logic, or associated information. Storing protected information, such as code and/or embedded confidential information, in the execute-only memory 130 may avoid the protected information from being read or retrieved from memory for any purpose other than code execution. In this manner, confidential and/or proprietary intellectual property stored on the execute-only memory 130 may be protected from access and/or reverse engineering by users of the computing device 100.

Figure 2:
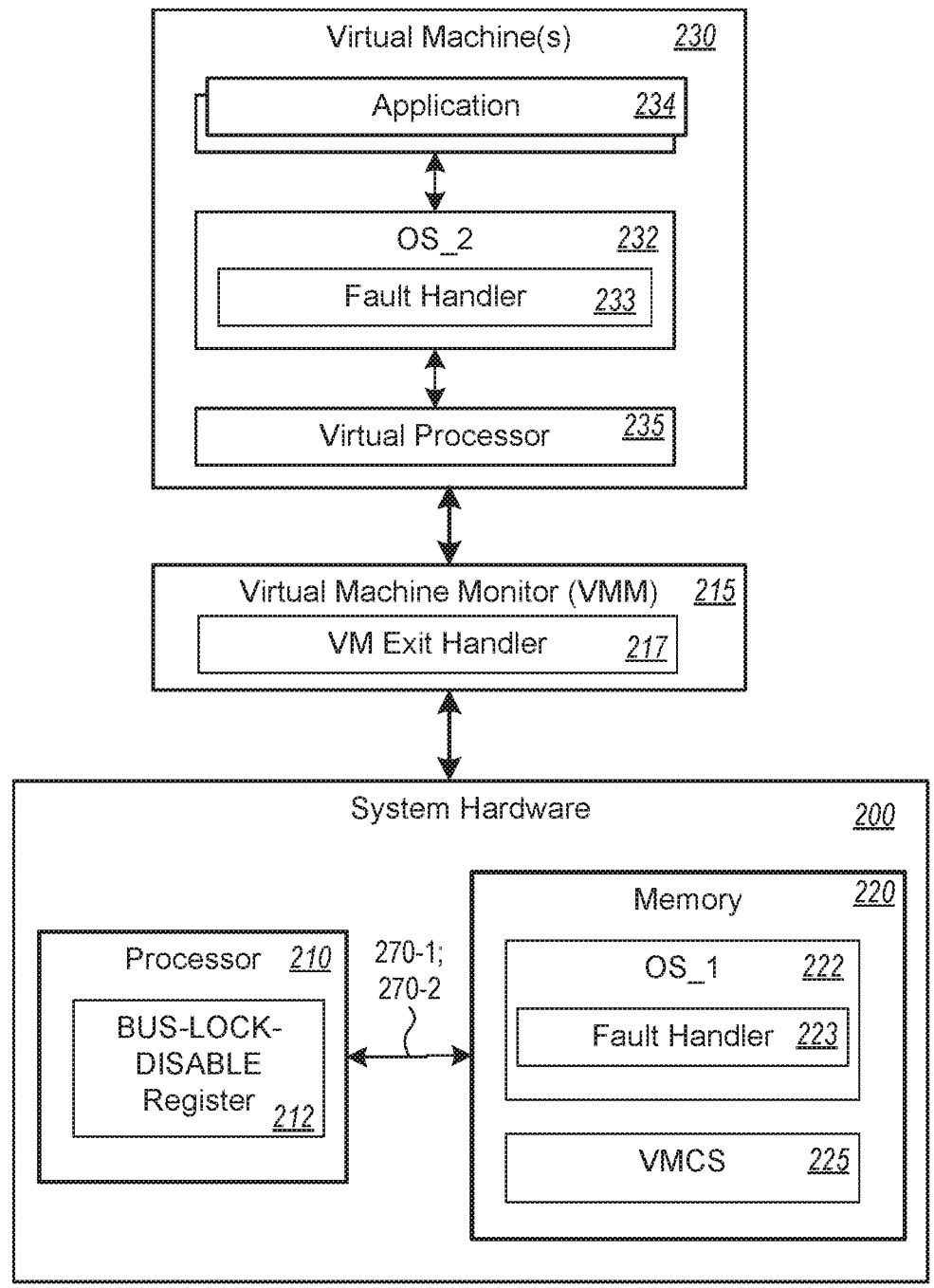
FIG. 2 is a block diagram of system hardware of the computing device of FIG. 1 that may execute a virtual machine monitor and one or more virtual machines, according to an embodiment of the present disclosure.

FIG. 2 is a block diagram of system hardware 200 of the computing device 100 of FIG. 1 that may execute a virtual machine monitor (VMM) 215 and one or more virtual machines 230, according to an embodiment of the present disclosure. The system hardware 200 may include a processor 210 (e.g., similar to the processor 110 of FIG. 1) and a memory 220 (e.g., similar to the memory 120 of FIG. 1). The processor 210 may include a bus-lock-disable register 212 where the register may be a model-specific register (MSR) in one embodiment, although the bus-lock-disable register 212 may also be some other kind of register. The memory 220 may store an image of an operating system 222 (which may include a fault handler 223) and a virtual machine control structure (VMCS) 225.

The fault handler 223 may be software executed within the operating system 222 and may handle, in a predetermined way, any number of faults that result from the image of the operating system running on the processor 210. For example, these faults may include a segment not present (#NP), a stack-segment fault (#SS), a general protection fault (#GP), or a page fault (#PF), as just a few examples. The fault handler 223 may be invoked by the operating system 222 in response to receipt of one of these faults or other types of faults.

The system hardware 200 may execute the VMM 215 (or hypervisor), which may further include a VM exit handler 217. The system hardware 200 may also execute one or more virtual machines 230. The VM exit handler 217 may be executed in software within the VMM and may invoked by the processor 210 to handle a VM exit from the virtual machine 230 when the VM encounters a fault or exception or other condition that requires exiting the virtual machine. The processor 210 may, for example, save the state of the guest VM 140 into the VMCS prior to invoking the VM exit handler 132. The VM exit handler 132 may, for example, access information the processor 210 has stored in the VMCS to inform the VMM of the reason why the VM exit occurred. The VMM 215 may manage and control the virtual machines 230, and in particular, control and facilitate the entries into and exits from the virtual machines, as may be required for certain processing requirements or the handling of faults, exceptions and the like within the virtual machines 230.

In one embodiment, each virtual machine 230 may include, but not be limited to, a virtual processor 235, an operating system 232 that includes a fault handler 233, and one or more applications 234 run within the operating system 232. The virtual processor 235 may use the underlying system hardware 200 to run threads used within the virtual machine 230. The VMM 215 may also perform memory management including translations of logical addresses of the virtual machine 230 to guest physical addresses and from guest physical addresses to host physical addresses stored in the memory 220. To perform such translations, the VMM may access page tables (or shadow page tables kept that mirror page tables of the operating system 232) and extended page tables that may be stored in the memory 225.

In one embodiment, the processor 210 may store a bus-lock-disable bit in the bus-lock-disable register 212 to indicate that bus locks are disabled. In this case, the execution unit 112 of the processor may, responsive to receiving a memory access request that requires acquiring a bus lock, signal a fault to the operating system 222 due to the bus-lock-disable bit being set within the bus-lock-disable register 212. The fault may be signaled in lieu of acquiring the bus lock for example. The fault may be a general protection fault, an exception, or some other system fault.

Figure 3:
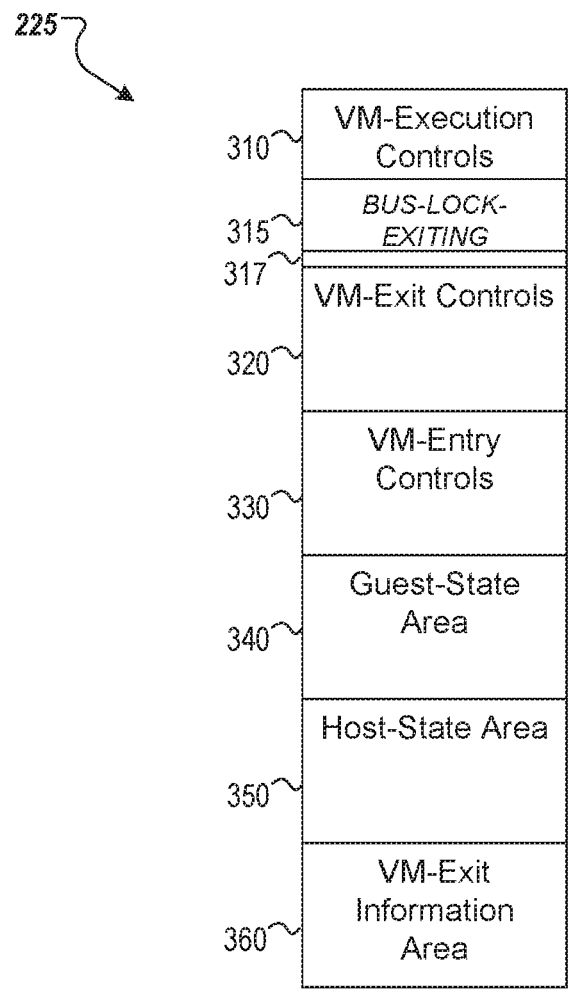
FIG. 3 is a block diagram of a virtual machine control structure (VMCS) in which is stored a bus-lock-exiting bit, according to an embodiment of the present disclosure.

FIG. 3 is a block diagram of the virtual machine control structure (VMCS) 225 of FIG. 2 in which is stored a bus-lock-exiting bit 315 and a bus lock policy bit 317, according to an embodiment of the present disclosure. The VMCS 225 may include various portions or areas, including a VM-execution controls portion 310 (in which is stored the bus-lock-exiting bit 315 and the bus lock policy bit 317), a VM-exit controls portion 320, a VM-entry controls portion 330, a guest-state area 340, a host-state area 350, and VM-exit information area 360.

In various embodiments, the VM-execution controls portion 310 may define how the processor 210 should react in response to different events occurring in the virtual machine 230. The VM-exit control portion 320 may define what the processor 210 should do when it exits from the virtual machine 230, e.g., store a guest state of the VM in the VMCS and load the VMM state from the VMCS. The VM-entry controls portion 330 may define what the processor 210 should do upon entry to the virtual machine 230, e.g., to conditionally load the guest state of the virtual machine from the VMCS, including debug controls, and inject an interrupt or exception, as necessary, to the virtual machine during entry. The guest-state area 340 may be a location where the processor 210 stores and loads a guest processor state upon exit from and entries to the virtual machine 230. The host-state area 350 may be a place where the processor 210 loads the VMM state upon exit from the virtual machine 230. The VM-exit information area 360 may be a location where the processor 210 stores information describing a reason of exit from the virtual machine.

In one embodiment, a processor core 111 may execute the instructions of the virtual machine 230 and of the VMM 215. As part of this execution of instructions, the processor core 111 may invoke logic to detect a condition with reference to execution of an instruction by the virtual machine that requires acquiring a bus lock. In on example, the condition is a memory access request of the virtual machine that requires acquiring the bus lock. The processor core 111 may then, responsive to detecting that the bus-lock-exiting bit 315 is enabled within the VMCS 225, perform a VM exit of the virtual machine to the VMM in lieu of acquiring the bus lock. The processor core 111 may further transmit, to the VMM, acquisition of a bus lock as a reason for the VM exit, which the processor core 111 may store in the VM-exit information area 360 of the VMCS.

In an alternative embodiment, the processor core 111 may, instead of performing a VM exit, signal a fault to the operating system 232 of the virtual machine 230 in response to executing an instruction that caused the memory request to issue requiring acquisition of a bus lock. The fault may be a general protection fault, a system fault, or a VM-related fault. Similarly as discussed with reference to FIG. 2, the processor core 111 may terminate execution of the instruction in response to the fault. Furthermore, the fault handler 233 of the operating system 232 may, in response to the fault, disable memory access by other agents and emulate execution of the instruction without requiring a bus lock.

In one embodiment, performing the VM exit is prioritized over signaling a fault or exception to an operating system of the virtual machine. Additionally, signaling a segmentation fault or a paging-related fault to an operating system of the virtual machine is prioritized over performing the VM exit. The processor core 111 may additionally, or alternatively, access a bus lock exit policy through the bus lock policy bit 317 of the VMCS, where the bus lock exit policy defines a threshold number of allowed bus locks (or a threshold number of bus locks per second). The processor core 111 may perform the VM exit from the virtual machine 230 responsive to receiving a request for a bus lock that exceeds the threshold number of allowed bus locks or responsive to detecting more than the threshold number of bus locks allowed per second.

Figure 4:
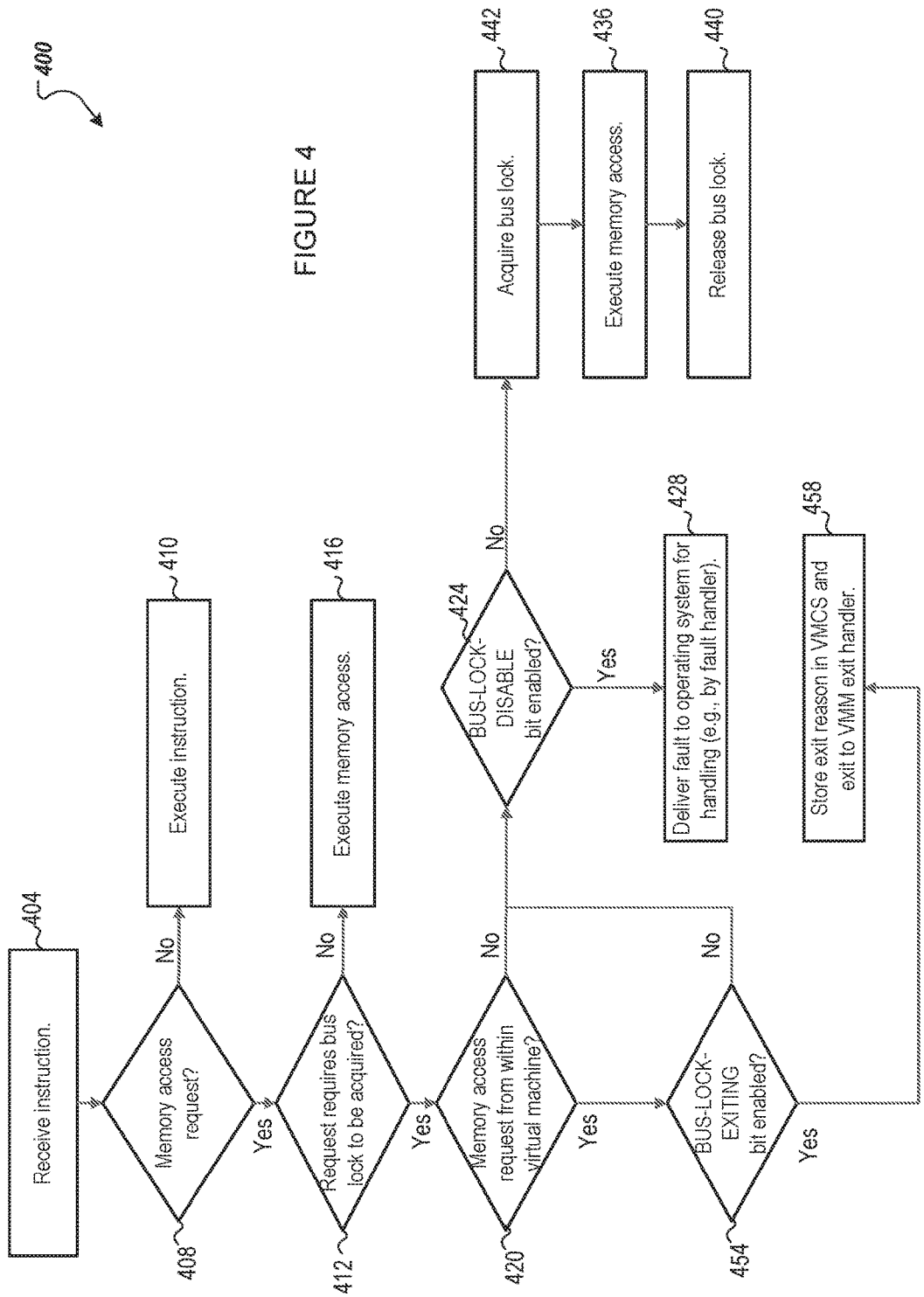
FIG. 4 is a flow diagram of a method of detecting and avoiding bus lock conditions, according to an embodiment of the present disclosure.

FIG. 4 is a flow diagram of a method 400 of detecting and avoiding bus lock conditions, according to an embodiment of the present disclosure. The method 400 may be performed by a system that may include hardware (e.g., circuitry, dedicated logic, and/or programmable logic), software (e.g., instructions executable on a computer system to perform hardware simulation), or a combination thereof. In an illustrative example, the method 400 may be performed by the processor core 111 of the processor 110 of FIG. 1, or by the system hardware 200 of FIG. 2, e.g., by the processor 210 executing instructions and accessing data stored in the memory 220 of FIG. 2. In one embodiment, it is the execution unit 112 of the processor core 111 performing the executing of an instruction that requires bus locking, and thus the execution unit 112 may perform all or some of the steps of the method 400.

More specifically, referring to FIG. 4, the method 400 may start where the processor may receive an instruction to execute (404), and determine whether the instruction includes or requires a memory access request (408). If the answer is no, the method 400 may continue with the execution unit executing the instruction 410. If the answer is yes, the method may continue with the processor determining whether the memory access request requires acquiring a bus lock (412). If the memory access request does not require a bus lock, the method may continue with the processor executing the memory access to retrieve needed data (416).

With further reference to FIG. 4, responsive to determining that the memory access request does require acquiring a bus lock, the method 400 may continue with the processor determining whether the memory access request issued from within a virtual machine (420). If the answer is no, then the method 400 may continue with the processor determining whether the bus-lock-disable bit within the bus-lock-disable register 212 is enabled (424). If the bus-lock-disable bit is enabled, the method 400 may continue with the processor delivering a fault to an operating system (428). The fault may be delivered to the fault handler for the operating system, to be handled according to the type of fault. For example, the fault may be a general protection fault that causes the processor to terminate execution of the instruction. The fault may be another kind of fault or exception with similar or different handling by the fault handler. If the bus-lock-disable bit is not enabled, however, then the method may continue by acquiring the bus lock (442), executing the memory access (436), and releasing the bus lock (440).

With further reference to FIG. 4, responsive to determining, at block 420, that the memory access request originates from within a virtual machine, the method 400 may continue with the processor determining whether a bus-lock-exiting bit is enabled within the VMCS (454). If the bus-lock-exiting bit is not enabled, the method 400 may continue to block 424 as before. If the bus-lock-exiting bit, however, is enabled, the method 400 may continue with the processor storing an exit reason in the VMCS (e.g., as acquisition of a bus lock) and performing a VM exit of the virtual machine to the VMM in lieu of acquiring the bus lock (458). In one alternative embodiment, the processor may perform the VM exit of the virtual machine responsive to receiving a request for a bus lock that exceeds the threshold number of allowed bus locks or responsive to detecting more than the threshold number of bus locks allowed per second. Different or additional constraints may be used to trigger the VM exit to the VMM to avoid the acquisition of a bus lock.

In various embodiments, performing the VM exit is prioritized over signaling a fault or exception to an operating system of the virtual machine. Additionally, signaling a segmentation fault or a paging-related fault to an operating system of the virtual machine is prioritized over performing the VM exit.

Figure 5:
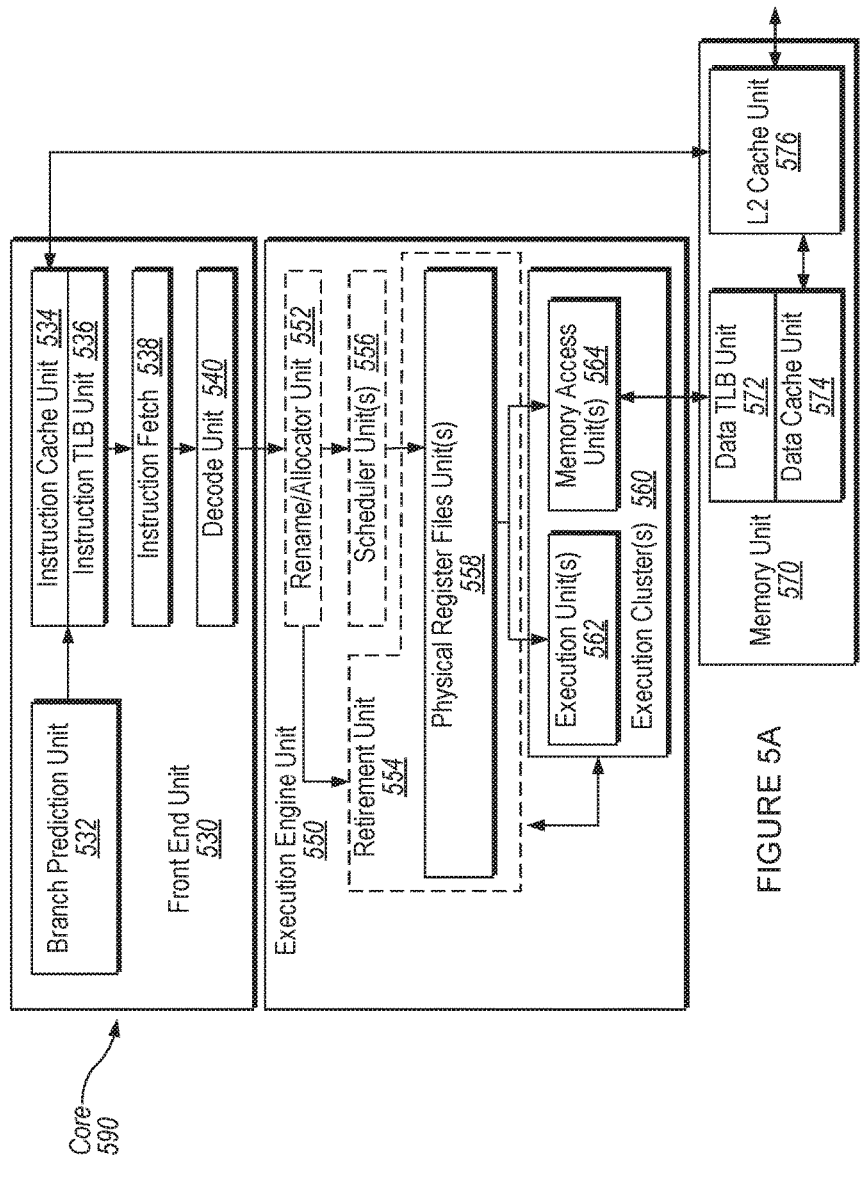
FIG. 5A is a block diagram illustrating an in-order pipeline and a register renaming stage, out-of-order issue/execution pipeline according to one embodiment.
FIG. 5B is a block diagram illustrating a micro-architecture for a processor that detects and avoids bus lock conditions.

FIG. 5A is a block diagram illustrating a micro-architecture for a processor 500 that is used to detect and avoid bus lock conditions. Specifically, processor 500 depicts an in-order architecture core and a register renaming logic, out-of-order issue/execution logic to be included in a processor according to at least one embodiment of the disclosure. The embodiments of detecting and avoiding bus lock conditions can be implemented in processor 500.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 534, data cache unit 574, and L2 cache unit 576 would not generally implement the process described in this disclosure, as generally these cache units use on-die memory that does not exhibit page-locality behavior.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
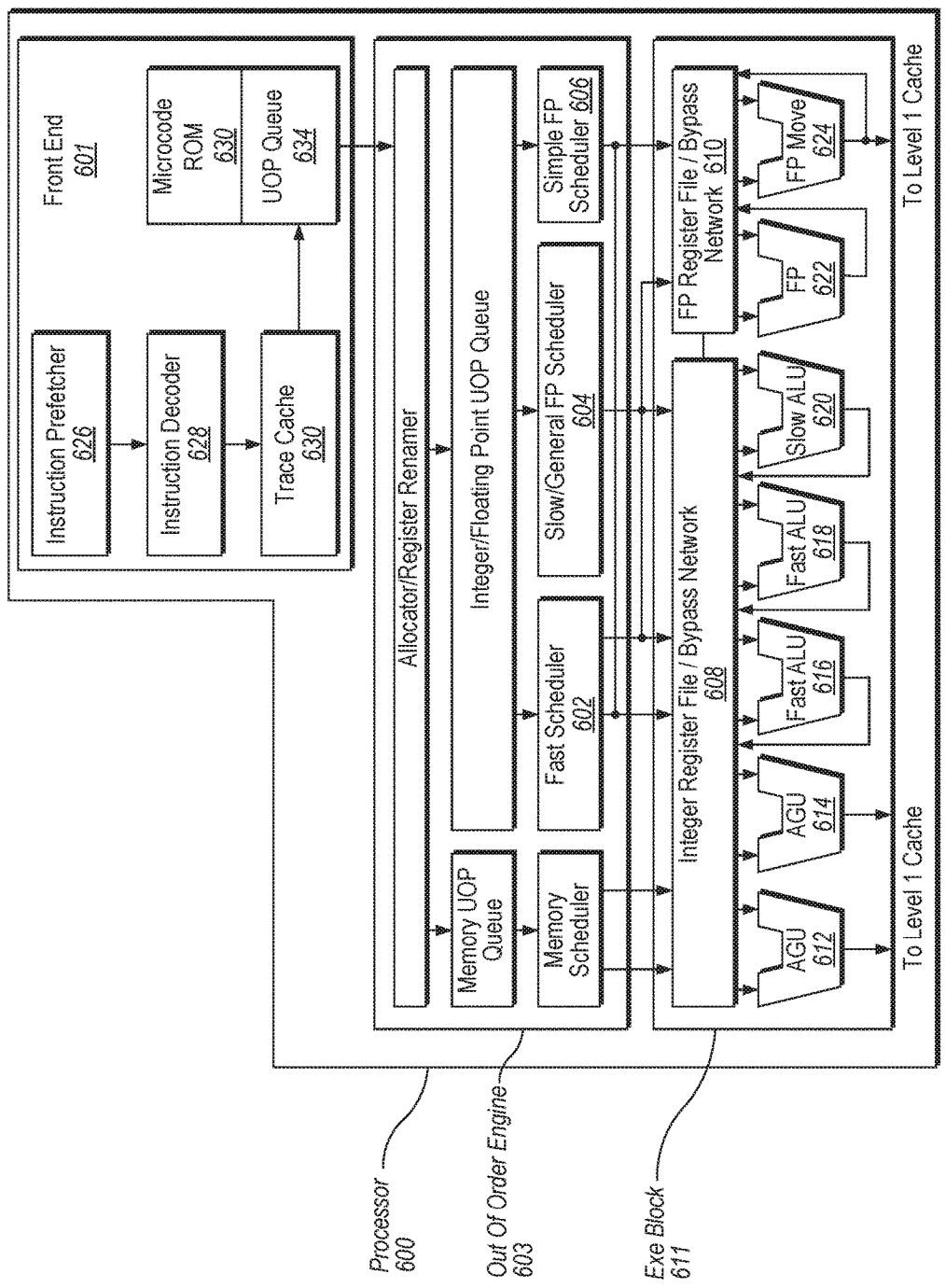
FIG. 6 illustrates a block diagram of the micro-architecture for a processor that includes logic circuits to detect and avoid bus lock conditions.

FIG. 6 illustrates a block diagram of the micro-architecture for a processor 600 that includes logic circuits that may be used to detect and avoid bus lock conditions according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline. The embodiments of the page additions and content copying can be implemented in processor 600.

The front end 601 may include several units. In one embodiment, the instruction prefetcher 616 fetches instructions from memory and feeds them to an instruction decoder 618 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, microcode ROM (or RAM) 632 provides the uops needed to complete the operation.

Some instructions are converted into a single micro-op, whereas others need several micro-ops to complete the full operation. In one embodiment, if more than four micro-ops are needed to complete an instruction, the decoder 618 accesses the microcode ROM 632 to do the instruction. For one embodiment, an instruction can be decoded into a small number of micro ops for processing at the instruction decoder 618. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 610, floating point ALU 612, floating point move unit 614. For one embodiment, the floating point execution blocks 612, 614, execute floating point, MMX, SIMD, and SSE, or other operations. The floating point ALU 612 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 622, 624. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
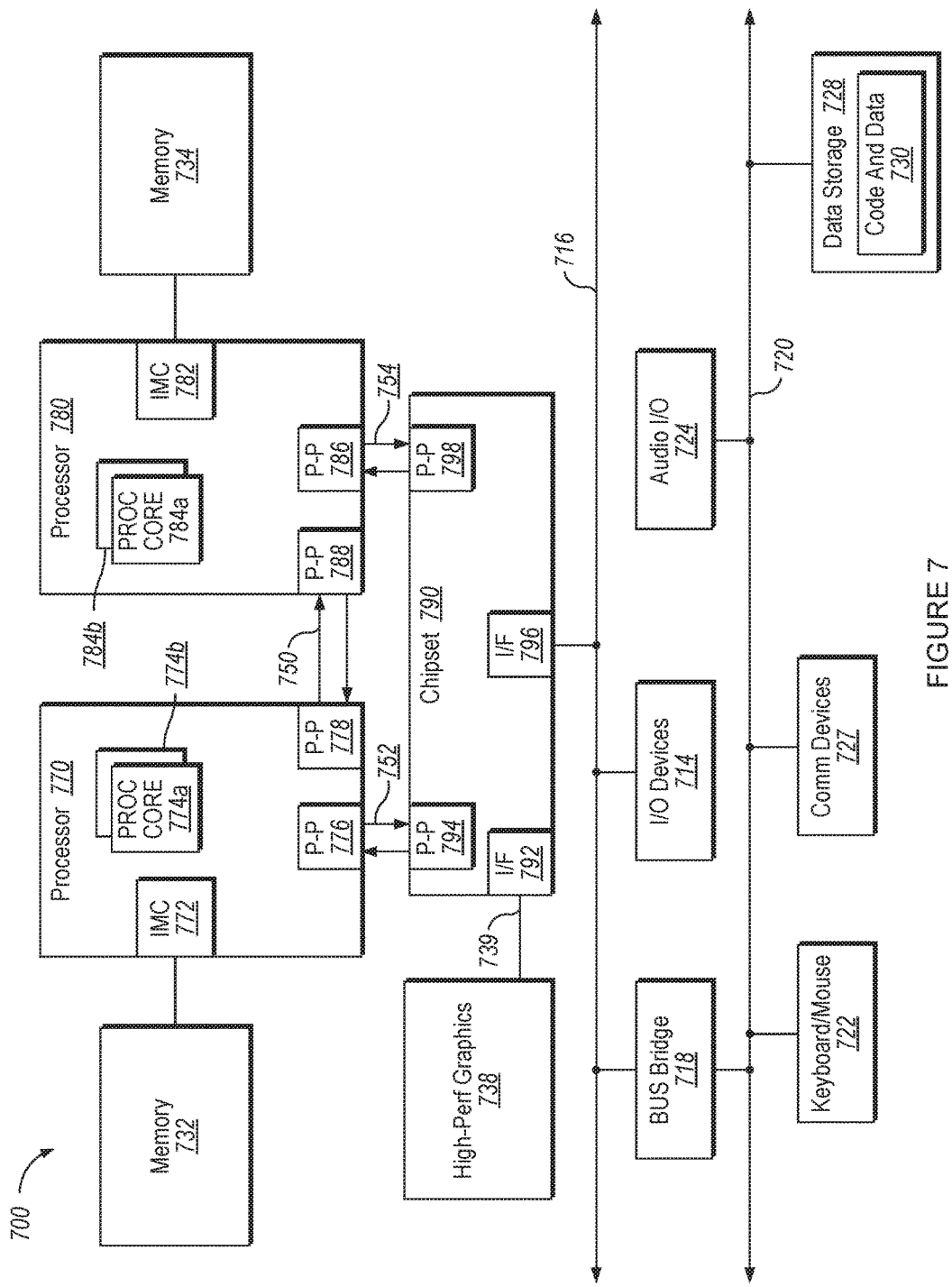
FIG. 7 is a block diagram of a computer system according to one implementation.

Embodiments may be implemented in many different system types. Referring now to FIG. 7, shown is a block diagram of a multiprocessor system 700 in accordance with an implementation. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774*a* and 774*b* and processor cores 784*a* and 784*b*), although potentially many more cores may be present in the processors.

While shown with two processors 770, 780, it is to be understood that the scope of the present disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 790 may be coupled to a first bus 716 via an interface 796. In one embodiment, first bus 716 may be a Peripheral Component Interconnect (PCI) bus, or a bus such as a PCI Express bus or interconnect bus, although the scope of the present disclosure is not so limited.

Figure 8:
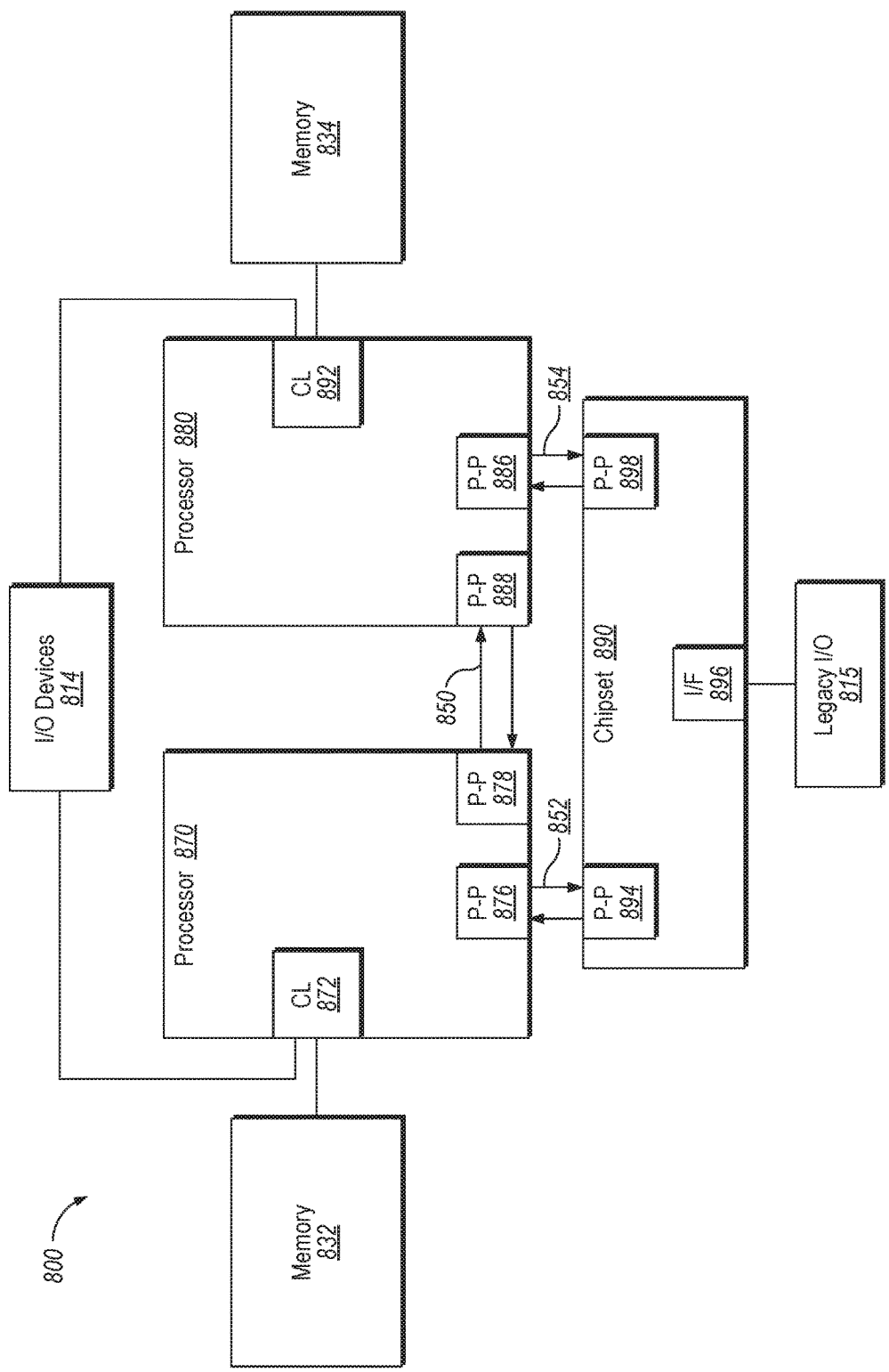
FIG. 8 is a block diagram of a computer system according to another implementation.

Referring now to FIG. 8, shown is a block diagram of a third system 800 in accordance with an embodiment of the present disclosure. Like elements in FIGS. 7 and 8 bear like reference numerals, and certain aspects of FIG. 8 have been omitted from FIG. 7 in order to avoid obscuring other aspects of FIG. 8.

FIG. 8 illustrates that the processors 870, 880 may include integrated memory and I/O control logic ("CL") 872 and 892, respectively. For at least one embodiment, the CL 872, 882 may include integrated memory controller units such as described herein. In addition, CL 872, 892 may also include I/O control logic. FIG. 8 illustrates that the memories 832, 834 are coupled to the CL 872, 892, and that I/O devices 814 are also coupled to the control logic 872, 892. Legacy I/O devices 815 are coupled to the chipset 890.

Figure 9:
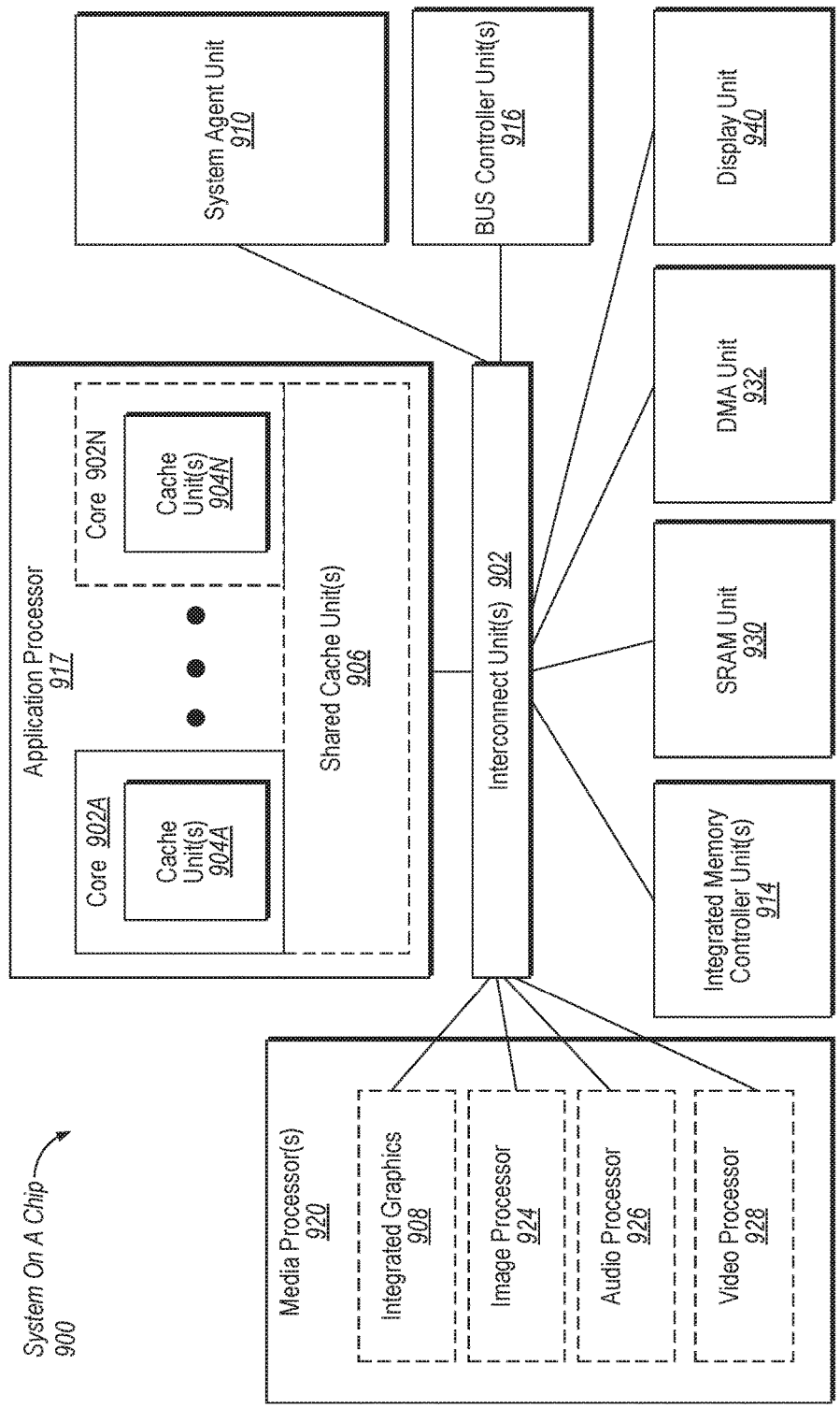
FIG. 9 is a block diagram of a system-on-a-chip according to one implementation.

FIG. 9 is an exemplary system on a chip (SoC) 900 that may include one or more of the cores 902. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 900 of FIG. 9, dashed lined boxes are features on more advanced SoCs. An interconnect unit(s) 902 may be coupled to: an application processor 917 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
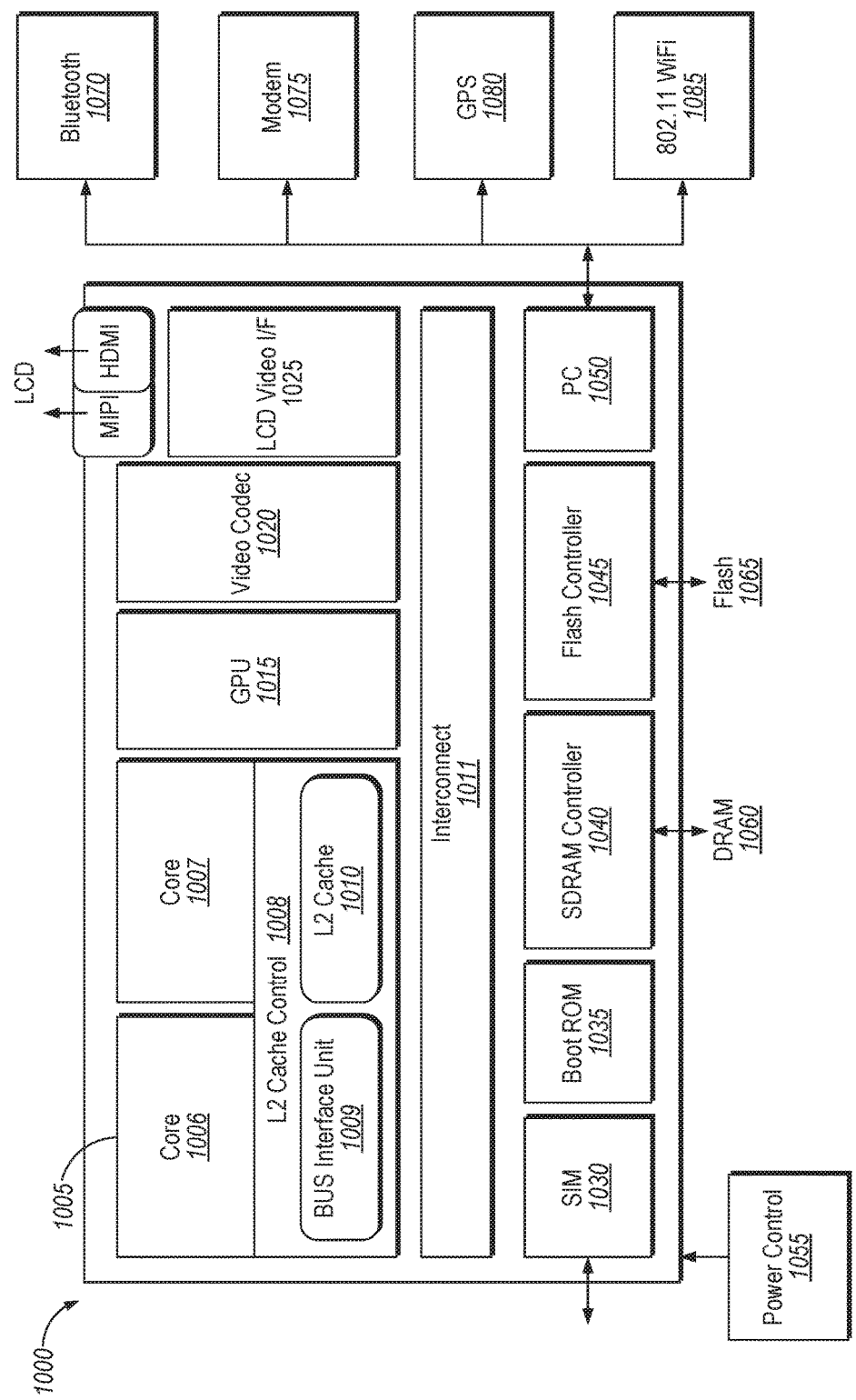
FIG. 10 illustrates another implementation of a block diagram for a computing system.

Turning next to FIG. 10, an embodiment of a system on-chip (SoC) design in accordance with embodiments of the disclosure is depicted. As an illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

In one embodiment, SDRAM controller 1040 may connect to interconnect 1011 via cache 125. Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the embodiments described herein.

In addition, the system illustrates peripherals for communication, such as a Bluetooth® module 1070, 3G modem 1075, GPS 1080, and Wi-Fi® 1085. Note as stated above, a UE includes a radio for communication. As a result, these peripheral communication modules may not all be included. However, in a UE some form of a radio for external communication should be included.

Figure 11:
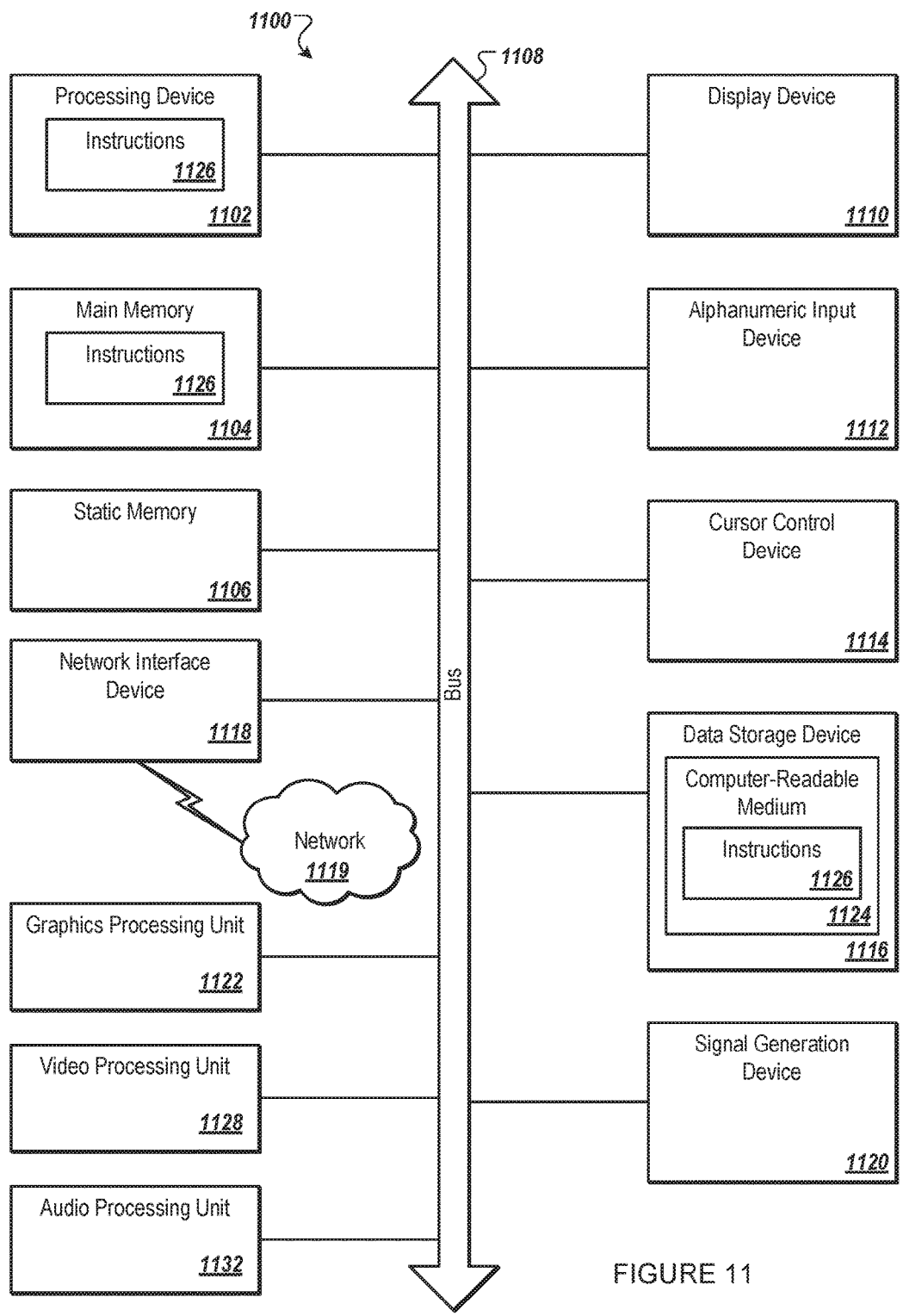
FIG. 11 illustrates another implementation of a block diagram for a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1100.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1108. In one embodiment, the bus 1108 may be made up of the system bus 170-1 and/or the memory bus 170-2 of FIG. 1, and the memory and peripheral devices sharing the bus 1108 may be or work through the system agent 114 similar to as discussed with reference to FIG. 1.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processor cores.

The processing device 1102 is configured to execute the processing logic 1126 for performing the operations discussed herein.

In one embodiment, processing device 1102 can be part of the computing system 100 of FIG. 1. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1110 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, such as described with respect to FIGS. 1 and 2, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a register to store a bus-lock-disable bit; and 2) an execution unit to execute instructions, wherein the execution unit is to: a) receive an instruction that includes a memory access request; b) determine that the memory access request requires acquiring a bus lock; and c) responsive to detecting that the bus-lock-disable bit indicates that bus locks are disabled, signal a fault to an operating system.

In Example 2, the processor of Example 1, wherein the fault is a general protection fault.

In Example 3, the processor of Example 1, wherein the register is a model-specific register.

In Example 4, the processor of Example 1, wherein the execution unit is further to terminate execution of the instruction responsive to detecting that the bus-lock-disable bit is enabled.

In Example 5, the processor of Example 1, wherein the execution unit is further to, responsive to the fault, execute a fault handler of the operating system to: a) disable memory accesses by other agents; and b) emulate execution of the instruction without requiring a bus lock.

In Example 6, the processor of Example 1, wherein the memory access request comprises a locked operation to uncacheable memory.

In Example 7, the processor of Example 1, wherein the memory access request comprises a locked operation that spans multiple cache lines.

In Example 8, the processor of Example 1, wherein the memory access request comprises a page-walk from a page table in uncacheable memory.

Various embodiments may have different combinations of the structural features described above. For instance, all optional features of the computing system described above may also be implemented with respect to the method or process described herein and specifics in the examples may be used anywhere in one or more embodiments.

Example 9 is a system on a chip (SoC) comprising: 1) a memory to store a virtual machine control structure (VMCS); and 2) a core coupled to the memory, wherein the core is to execute instructions of a virtual machine (VM), and wherein the core is to execute a virtual machine monitor (VMM) to a) control entry into and exit from the virtual machine; wherein the core is further to: b) execute VM extensions execution control instructions to detect a condition with reference to execution of the virtual machine that requires acquiring a bus lock; and c) responsive to detecting that a bus-lock-exiting bit is enabled by a field of the VMCS, perform a VM exit to the VMM to preempt execution of the virtual machine in lieu of acquiring the bus lock.

In Example 10, the SoC of Example 9, wherein the condition comprises a memory access request of the virtual machine that requires acquiring the bus lock.

In Example 11, the SoC of Example 9, wherein the core is further to store, in the VMCS, acquisition of a bus lock as a reason for the VM exit.

In Example 12, the SoC of Example 9, wherein the VM exit is prioritized over signaling a fault or exception to an operating system of the virtual machine.

In Example 13, the SoC of Example 9, wherein the core is further to: a) retrieve, from a bus lock policy bit of the VMCS, a bus lock exit policy defining a threshold number of allowed bus locks; and b) perform the VM exit of the virtual machine to the VMM responsive to receiving a request for a bus lock that exceeds the threshold number of allowed bus locks.

Various embodiments may have different combinations of the structural features described above. For instance, all optional features of the processors and methods described above may also be implemented with respect to a system described herein and specifics in the examples may be used anywhere in one or more embodiments.

Example 14 is a system comprising: a) a memory to store a virtual machine control structure (VMCS); and b) a processor coupled to the memory, wherein the processor is to execute instructions of a virtual machine (VM), and wherein the processor is to a) execute a virtual machine monitor (VMM) to manage the virtual machine; wherein the processor is further to: b) execute VM extensions execution control instructions to detect a memory access in response to executing an instruction within the virtual machine that requires acquiring a bus lock; and c) responsive to detecting that a bus-lock-exiting bit is enabled within the VMCS, perform a VM exit to the VMM to preempt execution of the virtual machine in lieu of acquiring the bus lock.

In Example 15, the system of Example 14, wherein the processor is further to store, in the VMCS, acquisition of a bus lock as a reason for the VM exit.

In Example 16, the system of Example 14, wherein the VM exit is prioritized over signaling a fault or exception to an operating system of the virtual machine.

In Example 17, the system of Example 14, wherein the processor is further to: a) retrieve, from a bus lock policy bit of the VMCS, a bus lock exit policy defining a threshold number of allowed bus locks; and b) perform the VM exit of the virtual machine to the VMM responsive to receiving a request for a bus lock that exceeds the threshold number of allowed bus locks.

Various embodiments may have different combinations of the structural features described above. For instance, all optional features of the processors and methods described above may also be implemented with respect to a system described herein and specifics in the examples may be used anywhere in one or more embodiments.

Example 18 is a method comprising: a) receiving, by execution unit of a processor, an instruction that generates a memory access request; b) determining, by the execution unit, that the memory access request requires acquiring a bus lock; and c) responsive to determining that a bus-lock-disable bit is enabled within a register, transmitting, by the execution unit, a fault to an operating system.

In Example 19, the method of Example 18, wherein the fault is a general protection fault.

In Example 20, the method of Example 18, further comprising terminating, by the execution unit, execution of the instruction responsive to detecting that the bus-lock-disable bit is enabled.

In Example 21, the method of Example 18, further comprising, responsive to the fault, executing a fault handler to: a) disable memory accesses by other agents; and b) emulate execution of the instruction without requiring a bus lock.

In Example 22, the method of Example 18, further comprising, responsive to determining that the memory access request originates from a virtual machine (VM) and that a bus-lock-exit bit is enabled within a virtual machine control structure (VMCS) of the VM, performing a VM exit of the virtual machine to a virtual machine monitor (VMM), to preempt execution of the VM in lieu of acquiring the bus lock.

In Example 23, the method of Example 22, further comprising storing, in the VMCS, acquisition of a bus lock as a reason for the VM exit.

In Example 24, the method of Example 22, wherein signaling a segmentation fault or a paging-related fault to an operating system of the virtual machine is prioritized over performing the VM exit.

In Example 25, the method of Example 22, further comprising: a) receiving, from the VMM, a bus lock exit policy defining a threshold number of allowed bus locks per second; and b) performing the VM exit of the virtual machine to the VMM responsive to detecting more than the threshold number of bus locks allowed per second.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock.

Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
a register to store a bus-lock-disable bit; and
an execution unit to execute instructions, wherein the execution unit is to:
receive an instruction that includes a memory access request;
determine that the memory access request requires acquiring a bus lock;
responsive to detecting that the bus-lock-disable bit indicates that bus locks are disabled, signal a fault to an operating system; and
responsive to a determination that the memory access request originates from a virtual machine (VM) and that a bus-lock-exit bit is enabled within a virtual machine control structure (VMCS) associated with the VM, perform a VM exit of the VM to a virtual machine monitor (VMM), to preempt execution of the VM in lieu of acquiring the bus lock.

2. The processor of claim 1, wherein the fault is a general protection fault.

3. The processor of claim 1, wherein the register is a model-specific register.

4. The processor of claim 1, wherein the execution unit is further to terminate execution of the instruction responsive to detecting that the bus-lock-disable bit is enabled.

5. The processor of claim 1, wherein the execution unit is further to, responsive to the fault, execute a fault handler of the operating system to:
disable memory accesses by an agent other than the operating system; and
emulate execution of the instruction without requiring a bus lock.

6. The processor of claim 1, wherein the memory access request comprises a locked operation to uncacheable memory.

7. The processor of claim 1, wherein the memory access request comprises a locked operation that spans multiple cache lines.

8. The processor of claim 1, wherein the memory access request comprises a page-walk from a page table in uncacheable memory.

9. A system on a chip (SoC) comprising:
a memory to store a virtual machine control structure (VMCS); and
a core coupled to the memory, wherein the core is to execute instructions of a virtual machine (VM), and wherein the core is to execute a virtual machine monitor (VMM) to control entry into and exit from the virtual machine;
wherein the core is further to:
execute VM extensions execution control instructions to detect a condition with reference to execution of the virtual machine that requires acquiring a bus lock; and
responsive to detecting that a bus-lock-exiting bit is enabled by a field of the VMCS, perform a VM exit to the VMM to preempt execution of the virtual machine in lieu of acquiring the bus lock.

10. The SoC of claim 9, wherein the condition comprises a memory access request of the virtual machine that requires acquiring the bus lock.

11. The SoC of claim 9, wherein the core is further to store, in the VMCS, acquisition of a bus lock as a reason for the VM exit.

12. The SoC of claim 9, wherein the VM exit is prioritized over signaling a fault or exception to an operating system of the virtual machine.

13. The SoC of claim 9, wherein the core is further to:
retrieve, from a bus lock policy bit of the VMCS, a bus lock exit policy defining a threshold number of allowed bus locks; and
perform the VM exit of the virtual machine to the VMM responsive to receiving a request for a bus lock that exceeds the threshold number of allowed bus locks.

14. A system comprising:
a memory to store a virtual machine control structure (VMCS); and
a processor coupled to the memory, wherein the processor is to execute instructions of a virtual machine (VM), and wherein the processor is to execute a virtual machine monitor (VMM) to manage the virtual machine;
wherein the processor is further to:
execute VM extensions execution control instructions to detect a memory access in response to executing an instruction within the virtual machine that requires acquiring a bus lock; and
responsive to detecting that a bus-lock-exiting bit is enabled within the VMCS, perform a VM exit to the VMM to preempt execution of the virtual machine in lieu of acquiring the bus lock.

15. The system of claim 14, wherein the processor is further to store, in the VMCS, acquisition of a bus lock as a reason for the VM exit.

16. The system of claim 14, wherein the VM exit is prioritized over signaling a fault or exception to an operating system of the virtual machine.

17. The system of claim 14, wherein the processor is further to:
retrieve, from a bus lock policy bit of the VMCS, a bus lock exit policy defining a threshold number of allowed bus locks; and perform the VM exit of the virtual machine to the VMM responsive to receiving a request for a bus lock that exceeds the threshold number of allowed bus locks.

18. A method comprising:

receiving, by execution unit of a processor, an instruction that generates a memory access request;

determining, by the execution unit, that the memory access request requires acquiring a bus lock;

responsive to determining that a bus-lock-disable bit is enabled within a register, transmitting, by the execution unit, a fault to an operating system; and responsive to determining that the memory access request originates from a virtual machine (VM) and that a bus-lock-exit bit is enabled within a virtual machine control structure (VMCS) associated with the VM, performing a VM exit of the virtual machine to a virtual machine monitor (VMM), to preempt execution of the VM in lieu of acquiring the bus lock.

19. The method of claim 18, wherein the fault is a general protection fault.

20. The method of claim 18, further comprising terminating, by the execution unit, execution of the instruction responsive to detecting that the bus-lock-disable bit is enabled.

21. The method of claim 18, further comprising, responsive to the fault, executing a fault handler to:

disable memory accesses by an agent other than the operating system; and emulate execution of the instruction without requiring a bus lock.

22. The method of claim 18, further comprising storing, in the VMCS, acquisition of a bus lock as a reason for the VM exit.

23. The method of claim 18, wherein signaling a segmentation fault or a paging-related fault to an operating system of the virtual machine is prioritized over performing the VM exit.

24. The method of claim 18, further comprising:

receiving, from the VMM, a bus lock exit policy defining a threshold number of allowed bus locks per second; and performing the VM exit of the virtual machine to the VMM responsive to detecting more bus locks than the threshold number of bus locks allowed per second.

* * * * *